United States Patent [19]

Shimizu et al.

[11] Patent Number: 5,614,329
[45] Date of Patent: Mar. 25, 1997

[54] SOFT-MAGNETIC THIN FILM

[75] Inventors: Osamu Shimizu, Minami-ashigara; Kanji Nakanishi, Hadano, both of Japan

[73] Assignee: Fuji Photo Film Co., Ltd., Kanagawa, Japan

[21] Appl. No.: 845,619

[22] Filed: Mar. 4, 1992

[30] Foreign Application Priority Data

Mar. 5, 1991 [JP] Japan ................................. 3-062468

[51] Int. Cl.$^6$ .............................................. G11B 5/66
[52] U.S. Cl. ................... 428/694 T; 428/611; 428/678; 428/680; 428/681; 428/692; 428/694 R; 428/900; 204/192.2; 360/110; 360/125; 360/126; 427/127
[58] Field of Search .................................. 428/611, 694, 428/900, 678, 680, 681, 882, 694 R, 694 T; 427/127; 360/110, 125, 126; 204/192.2

[56] References Cited

U.S. PATENT DOCUMENTS

| | | | |
|---|---|---|---|
| 4,786,553 | 11/1988 | Shiroishi et al. | 428/330 |
| 4,835,069 | 5/1989 | Sawada et al. | 428/694 T |
| 4,837,094 | 6/1989 | Kudo | 428/694 T |
| 4,935,314 | 6/1990 | Kobayashi et al. | 428/694 ML |
| 5,006,388 | 4/1991 | Kuzuo et al. | 428/65.7 |
| 5,055,364 | 10/1991 | Hatwa | 428/694 ML |
| 5,082,750 | 1/1992 | Morichika et al. | 428/694 TB |
| 5,091,266 | 2/1992 | Omoute | 428/692 |
| 5,114,778 | 5/1992 | Yanai et al. | 428/141 |

FOREIGN PATENT DOCUMENTS 0303324  2/1989  European Pat. Off. .

OTHER PUBLICATIONS

Japanese Article No. 538, Suzulo et al, 1990, p. 419 Japan Institute of Metallurgy.
Japanese Article No. 539, Suzulo et al. 1990, p. 420 Japan Institute of Metallurgy.
Japanese Article No. 538, titled "Soft Magnetic Properties of Ultra–Fine Size bcc Fe–Zr–B Alloy Having High Saturation Magnetization," Suzuki et al, 1990, p. 419, Japan Institute of Metallurgy Fall Meeting.
Japanese Article No. 539, titled "Effects of Addition Elements on Soft Magnetic Properties of Ultra–Fine Size bcc Fe–Zr–B Alloy", Suzuki et al, 1990, p. 420, Japan Institute of Metallurgy Fall Meeting.

*Primary Examiner*—Leszek Kiliman
*Attorney, Agent, or Firm*—Sughrue, Mion, Zinn, Macpeak & Seas

[57] ABSTRACT

A soft magnetic thin film represented by the formula $Fe_aX_bZr_cB_d$, wherein a, b, c and d stand for atomic percents for respective components and X indicates at least one of Co, Ni, Cr and V. The proportions of the components is such that $86 \leq a+b \leq 93$, $0 < b \leq 10$, $4 \leq c \leq 9$ and $1 \leq d \leq 8$. The thin film exhibits satisfactory soft magnetic properties even when it is formed by thin film forming methods through vapor deposition, such as sputtering.

19 Claims, 3 Drawing Sheets

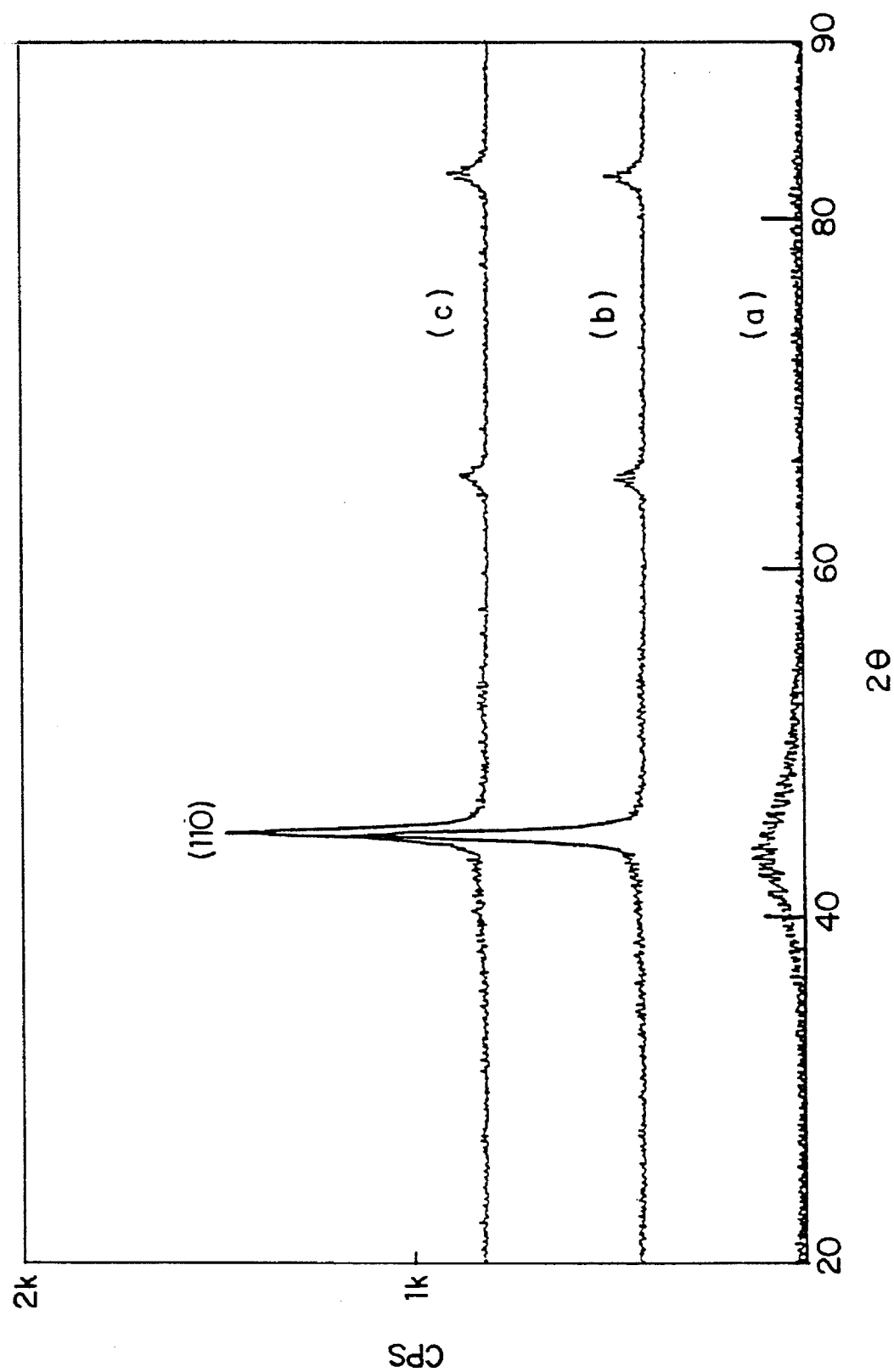

SOFT-MAGNETIC THIN FILM

FIELD OF THE INVENTION

This invention relates to a soft magnetic thin film exhibiting high saturation magnetic flux density and high magnetic permeability at high frequency, and which may be used advantageously as, e.g., a core material for a high density recording/reproducing magnetic head.

BACKGROUND

In a magnetic recording/reproducing apparatus, such as an audio tape recorder or a video tape recorder (VTR), investigations for increasing the density and/or quality of recording signals are presently under way. In keeping up with such tendency towards high-density recording, so-called metal tapes in which powders of metals, such as Fe, Co or Ni, or alloys thereof, are used as magnetic powders for a magnetic recording medium, or so-called deposited tape in which a ferromagnetic metal material is directly deposited on a base film by a vacuum thin film forming technique, have been developed and put to practical application in various technical fields.

DESCRIPTION OF THE RELATED ART

Meanwhile, for demonstration of the characteristics of a magnetic recording medium exhibiting prescribed coercivity, it is required of a core material of a magnetic head core to exhibit a high saturation magnetic flux density and, in addition thereto, a high magnetic permeability if the same magnetic head is to be used simultaneously for reproduction.

Recently, a report has been made in Ippan Kouen Gaiyo (Synopsis of General Lectures), Japan Institute of bletallurgy, 1990 Fall Meeting (107th Meeting), Nos. 419 and 420, that a ribbon-shaped sample of an alloy FeBZr, or further admixed with Cu, exhibits a high saturation magnetic flux density and a high magnetic permeability.

It has been reported that the ribbon-shaped sample of the FeBZr alloy has been obtained by arc-melting a feed material of a predetermined composition, processing the molten material into the ribbon shape by single roll quenching and by heat-treating the ribbon-shaped material under predetermined conditions.

It has also been reported that the ribbon-shaped FeBZrCu alloy samples are produced in the same manner as the ribbon-shaped FeBZr alloy samples, and that, due to the presence of Cu, soft magnetic properties may be improved, at the same time that the range of the composition exhibiting high magnetic permeability may be expanded.

PROBLEMS TO BE SOLVED

The reported high permeability is believed to have been measured either at DC or at low frequency. The permeability at high frequency of such ribbon is in principle very small because of high eddy current loss due to the ribbon shape of the material.

Further, our experiments in which a thin film having a composition as described in the Synopsis was formed on a substrate, using thin film forming means, such as sputtering or vapor deposition, and heat treated in a prescribed manner, indicated that the thin film thus heat treated failed to display satisfactory soft magnetic properties.

OBJECT AND SUMMARY OF THE DISCLOSURE

It is an object of the present invention to provide a soft magnetic thin film which is free from the above mentioned drawback of the conventional technique.

Particularly, it is an object of the present invention to provide a soft magnetic thin film exhibiting high saturation magnetic flux density and high magnetic permeability at high frequency, and which may be used advantageously as, e.g., a core material for a high density recording/reproducing magnetic head.

For accomplishing the above object, according to the first aspect of the present invention there is provided a soft magnetic thin film represented by the formula $Fe_aX_bZr_cB_d$, wherein a, b, c and d stand for atomic percents of associated components, respectively, and X indicates at least one of Co, Ni, Cr and V, with proportions of the components being such that $86 \leq a+b \leq 93$, $0 < b \leq 10$, $4 \leq c \leq 9$ and $1 \leq d \leq 8$.

In the above formula, b is preferably not less than 0.5.

Meanwhile, Fe, Zr, B, Co, Ni, Cr and V stand for iron, zirconium, boron, cobalt, nickel, chromium, and vanadium, respectively.

According to the present invention, since at least one of Co, Ni, Cr and V is present in the composition of the soft magnetic thin film, besides Fe, Zr and B, satisfactory soft magnetic properties may be displayed even when the film is formed by thin film forming methods through vapor deposition, such as by sputtering. Above all, the soft magnetic thin film exhibits only low coercivity.

According to the second aspect of the present invention there is provide a soft magnetic thin film represented by the formula $Fe_aZ_fNi_eZr_cB_d$, wherein a, f, e, c and d stand for atomic percents of associated components, respectively, and Z indicates at least one of Cr, V and Co, with proportions of the components being such that $86 \leq a+e+f \leq 93$, $0 \leq f \leq 10$, $0 < e \leq 20$, $e+f \leq 20$, $4 \leq c \leq 9$ and $1 \leq d \leq 8$.

If the film is not of the compositions as defined above, the thin film tends to exhibit a higher coercivity and hence is unable to display satisfactory soft magnetic properties.

PREFERRED EMBODIMENTS

First Aspect

At least one of Co, Ni, Cr and V is contained in the composition, preferably, in an amount of 0.5 atomic percent or more because the effect of these components becomes more distinct in this range.

The composition of the soft magnetic thin film of the present invention in which the coercivity along the easy axis is preferably, not more than 5.5 Oe, more preferably not, more than 3 Oe, and most preferably, not more than 1.5 Oe (refer to FIG. 2).

The condition of the soft magnetic thin film of the present invention may also contain a minor amount of Cu.

The soft magnetic thin film of the present invention may be prepared by forming a thin film of the above mentioned specific composition by vapor deposition, such as RF sputtering, and heat-treating the thin film at, e.g., 500 to 600° C. for about one hour. If need be, heat treatment may be carried out in a magnetic field.

Second Aspect

According to the second aspect, Ni(e) is essential among "X" components of the first aspect and Ni is present up to 20 at %. (e+f) corresponds to "b" of the first aspect. Thus the features of the first aspect are also generally applicable to the second aspect except that the specific changes ascribable to the presence of Ni. The specific compositional range of the second aspect provides satisfactory soft magnetic properties at the desired high frequency range. Due to the presence of Ni, the coercivity Hc becomes stabilized at a low value below 2 Oe over the wide range of Ni amount, and thus Ni is contained preferably at least 0.5 at %, more preferably at least 1.5 at %. Also the presence of Ni serves to improve the corrosion resistance significantly.

BRIEF DESCRIPTION OF THE DRAWINGS

FIG. 3a, 3b and 3c are three different X-ray diffraction diagrams, wherein FIG. 3a shows an X-ray diffraction pattern of a soft magnetic thin film prior to heat treatment according to the present invention, FIG. 3b shows an X-ray diffraction pattern of the thin film shown in FIG. 3a, obtained after heat treatment, and FIG. 3c shows an X-ray diffraction pattern of a soft magnetic thin film having a composition outside the present invention, obtained after heat treatment.

Figure 1:
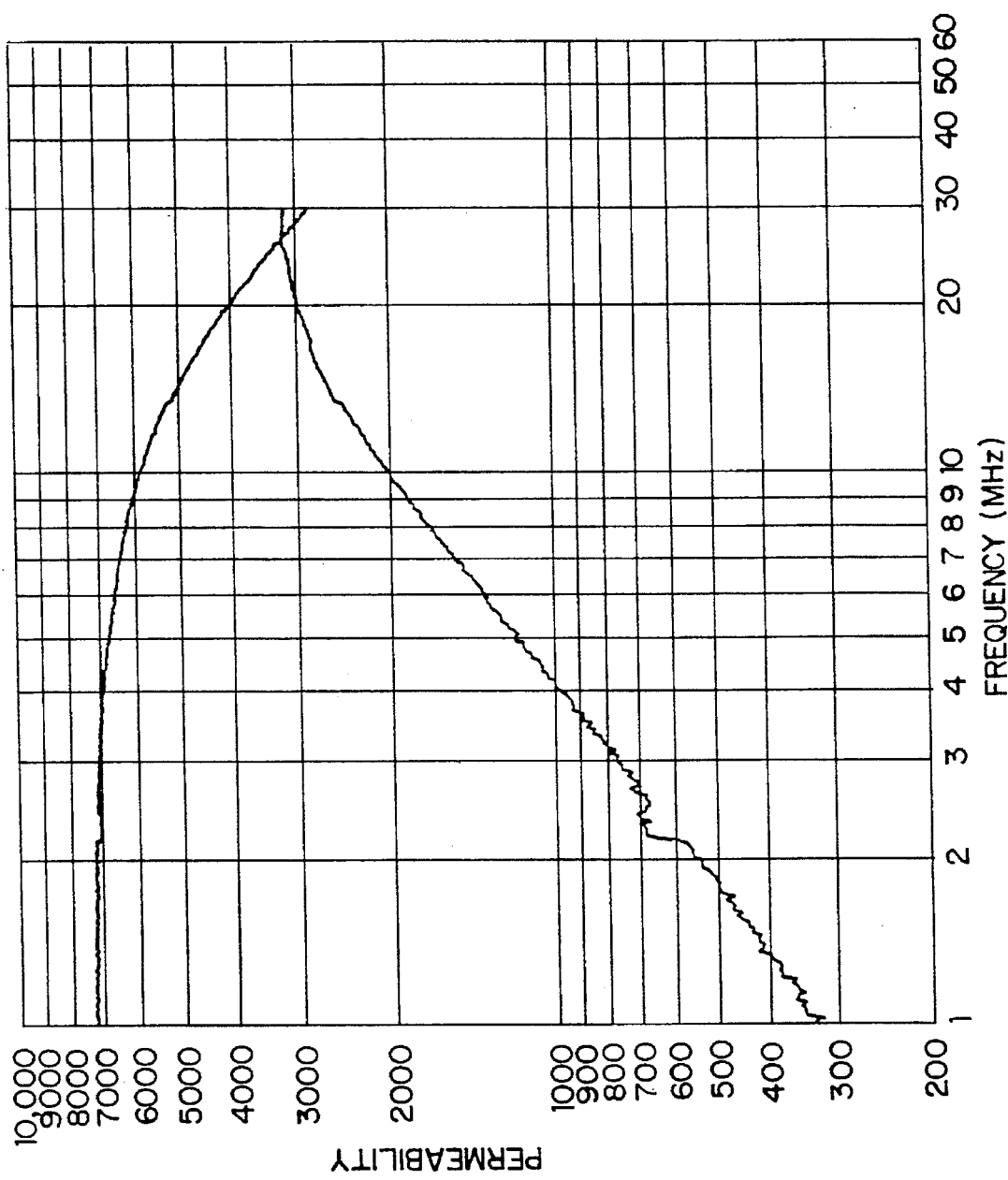
FIG. 1 shows frequency characteristics of magnetic permeability along a hard axis of magnetization of a soft magnetic thin film according to the present invention.

The present invention will be further illucidated in more detail with reference to the preferred examples for the illustrative purpose.

EXAMPLES

First Aspect

Examples 1 to 3

Zr chips and Co chips were suitably placed on an $Fe_{95}B_5$ target, where subscripts stand for atomic percents, and RF sputtering was carried out under an Ar gas atmosphere maintained at a pressure of 2.0 Pa and a cathodic power of 200 W, for forming three different FeCoZrB thin films, each being approximately 1 μm in thickness, on a sapphire substrate. These thin films were heat-treated at 550° C. for one hour in a magnetic field of approximately 1 kOe to produce soft magnetic thin films.

Table 1 shows the composition, coercivity along the easy axis and the sign (positive or negative) of magnetostriction of the so-produced soft magnetic thin films. Coercivity was measured using a 50 Hz B-H tracer under a measuring magnetic field of 25 Oe. (The same applies for the Examples and Reference Examples to follow.) The signs of the magnetostriction (positive or negative) were determined on the basis of changes in B-H characteristic on application of a mechanical stress to the soft magnetic thin films.

Reference Example 1

An FeZrB thin film was prepared in the same way as in Examples 1 to 3 except not arranging Co chips. Table 1 shows the composition, coercivity along the easy axis and the signs of magnetostriction (positive or negative) of the thin film after heat treatment. The signs (positive or negative) of magnetostriction were determined in the same way as in Examples 1 to 3.

TABLE 1

|  | Fe at % | Co at % | Zr at % | B at % | Hc [Oe] | Magneto-striction |
|---|---|---|---|---|---|---|
| Ex. 1 | 87.3 | 2.5 | 7.2 | 3.0 | 2.0 | ~0 |
| Ex. 2 | 86.5 | 3.4 | 7.1 | 3.0 | 1.9 | Plus |
| Ex. 3 | 83.6 | 6.6 | 7.0 | 2.8 | 1.7 | Plus |
| Ref. Ex. 1 | 89.7 | 0.0 | 7.2 | 3.1 | 7.4 | Minus |

The magnetostriction was measured in the plane of the films. We assume it is constant along all directions in the plane.

Examples 4 to 12

FeCoZrB thin films of various compositions were formed in the same manner as in Examples 1 to 3 except arranging four 5 mm×5 mm Co chips on FeZrB ternary system targets of various compositions. These thin films were heat-treated in the same manner as in Examples 1 to 3 to produce soft magnetic thin films.

Table 2 shows the compositions and coercivity along the easy axis of the so-produced soft magnetic thin films.

TABLE 2

|  | Fe at % | Co at % | Zr at % | B at % | Hc [Oe] |
|---|---|---|---|---|---|
| Ex. 4 | 88.7 | 3.1 | 6.2 | 2.0 | 2.7 |
| Ex. 5 | 87.7 | 3.2 | 5.8 | 3.3 | 1.4 |
| Ex. 6 | 87.4 | 3.0 | 7.7 | 1.9 | 1.8 |
| Ex. 7 | 86.0 | 3.2 | 9.1 | 1.7 | 3.6 |
| Ex. 8 | 85.9 | 3.3 | 4.4 | 6.4 | 3.6 |
| Ex. 9 | 85.9 | 3.3 | 6.3 | 4.5 | 1.5 |
| Ex. 10 | 84.6 | 3.4 | 7.6 | 4.4 | 2.2 |
| Ex. 11 | 85.7 | 3.3 | 7.7 | 3.3 | 2.0 |
| Ex. 12 | 84.4 | 3.4 | 9.1 | 3.1 | 5.3 |

Example 5 showed a saturation magnetic flux density Bs of 17.6 kG.

Reference Examples 2 to 13

FeZrB thin films of various compositions were prepared in the same manner as in Examples 4 to 12 except not arranging the Co chips. These thin films were heat-treated in the same manner as in Examples 1 to 3. Table 3 shows the composition and coercivity along the easy axis of the thin films, obtained after the heat treatment.

TABLE 3

|  | Fe at % | Zr at % | B at % | Hc [Oe] |
|---|---|---|---|---|
| Ref. Ex. 2 | 91.1 | 5.5 | 3.4 | 9.8 |
| Ref. Ex. 3 | 90.9 | 4.8 | 4.3 | 12.2 |
| Ref. Ex. 4 | 90.0 | 7.1 | 2.9 | 9.9 |
| Ref. Ex. 5 | 89.0 | 4.9 | 6.1 | 10.1 |
| Ref. Ex. 6 | 89.5 | 6.3 | 4.2 | 9.6 |
| Ref. Ex. 7 | 89.0 | 8.3 | 2.7 | 10.0 |
| Ref. Ex. 8 | 88.4 | 9.2 | 2.4 | 11.5 |
| Ref. Ex. 9 | 87.3 | 4.7 | 8.0 | 6.1 |
| Ref. Ex. 10 | 87.4 | 6.8 | 5.8 | 8.6 |
| Ref. Ex. 11 | 87.0 | 7.6 | 5.4 | 14.1 |
| Ref. Ex. 12 | 87.6 | 8.1 | 4.3 | 9.2 |
| Ref. Ex. 13 | 86.7 | 9.2 | 4.1 | 20.2 |

Examples 13 to 15

Three FeXZrB thin films, where X denotes Cr, Ni or V, were prepared in the same manner as in Examples 4 to 12 except placing Cr, Ni or V chips in place of the Co chips.

These thin films were heat-treated in the same manner as in Examples 1 to 3 to produce soft magnetic thin films.

Table 4 shows the compositions and coercivities along easy axis of the produced soft magnetic thin films.

Reference Example 14

An FeMnZrB thin film was produced in the same manner as in Examples 4 to 12, except arranging Mn chips in place of the Co chips, and heat-treated in the same manner as in Examples 1 to 3. Table 4 shows the composition and coercivity along easy axis of the heat-treated thin film.

TABLE 4

|  | Fe at % | X at % |  | Zr at % | B at % | Hc [Oe] |
|---|---|---|---|---|---|---|
| Ex. 13 | 87.3 | Cr | 2.9 | 5.7 | 4.0 | 1.5 |
| Ex. 14 | 86.8 | Ni | 3.6 | 5.6 | 4.0 | 1.7 |
| Ex. 15 | 88.7 | V | 1.5 | 5.7 | 4.1 | 2.0 |
| Ref. Ex. 14 | 88.2 | Mn | 2.0 | 5.7 | 4.0 | 7.5 |

It is seen from Tables 1 to 4 that Co, Cr, Ni and V are particularly selected elements.

Example 16

An FeCoZrB thin film having a thickness of 1.8 μm was produced in the same manner as in Example 5 except using a polished grazed alumina substrate of 2 inches in diameter in place of a sapphire substrate and protracting the deposition time by RF sputtering. This thin film was heat-treated in the same manner as in Examples 1 to 3 to produce soft magnetic thin film.

Measurement was made of magnetic permeability on the produced soft magnetic thin film along the hard axis with respect to the frequency The results are shown in FIG. 1 $\mu'$ and $\mu''$ represent real part and imaginal part, respectively.

Figure 2:
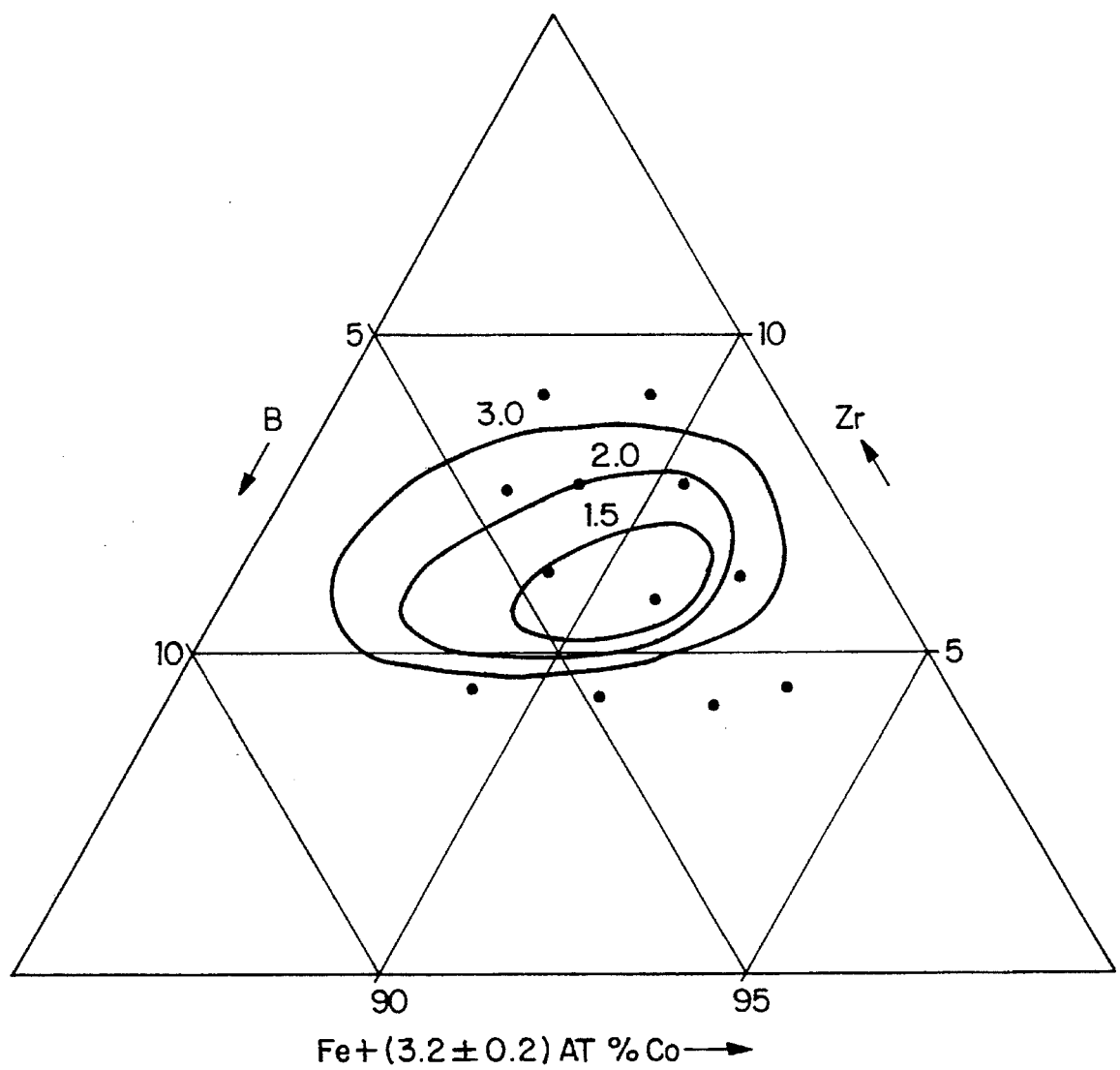
FIG. 2 shows the distribution of coercivity along an easy axis of magnetization of a soft magnetic thin film of an (Fe+Co)-Zr-B pseudo-ternary system according to the present invention.

The distribution of coercivity along the easy axis is shown in FIG. 2 for the case of an (Fe+Co)-Zr-B pseudo ternary system on the basis of data obtained in Examples 2 and 4 to 12.

FIG. 3a shows an X-ray diffraction pattern of an FeCoZrB thin film which was prepared in the same manner as in Example 5 and which is before the heat treatment. FIG. 3b shows an X-ray diffraction pattern of a soft magnetic thin film obtained after heat treatment in the same manner as in Examples 1 to 3. FIG. 3c shows an X-ray diffraction pattern of an FeZrB thin film prepared and heat-treated in the same manner as in Reference Example 6. Meanwhile, Ka rays of Cu was used as X-rays.

FIGS. 3a and 3b show that the film which was amorphous directly after deposition was crystallized to an substantial extent by the heat treatment showing alpha-Fe (bcc). Although FIGS. 3b and 3c indicate practically similar patterns, careful scrutiny indicates that the interplanar spacing of the (110) planes in FIG. 3b is slightly wider than that in FIG. 3c based on the slight shift of the peak indicative of the (110) plane in FIG. 3b toward left as compared to FIG. 3c. This is applicable to X=Co or Ni, while Cr and V show changes to reduce the interplanar spacing.

Although a bulk material, that is, a conventional ribbon-shaped sample, exhibits soft magnetic properties when the bulk material is of an FeBZr ternary system, (or those occasionally further admixed with Cu), a thin-film material of the ternary system, produced by vapor deposition, such as sputtering, fails to exhibit superior soft magnetic properties, unless the film material is of a quaternary system obtained by admixing X (=Co, Ni, Cr or V) to the above mentioned ternary FeBZr system (or of a quinquinary system if Cu is added to the quaternary system as mentioned above). Although not entirely clear, the mechanism may be explained in the following manner.

First, there is a probability that the thin film material differs from the bulk material with respect to magnetostriction, because of the orientation proper to the thin film which is mainly along the direction of the (110) plane, as may be presumed from FIG. 3.

Next, even granting that film material be not different markedly from the bulk material with respect to the magnetostriction, since the thin film is generally formed on a substrate and bound thereto, the probability is high that the thin film is subject to be affected by elastic energy and hence is unable to exhibit soft magnetic properties at the same value of magnetostriction, so that the value of magnetostriction would have to be reduced closer to zero.

According to the first aspect of the present invention, since at least one of Co, Ni, Cr and V is present in the above defined composition of the soft magnetic thin film, besides Fe, Zr and B, satisfactory soft magnetic properties may be displayed even when the film is formed by the thin film forming methods through vapor deposition, such as sputtering. That is, the soft magnetic thin film of the present invention has a saturation magnetic flux density of about at least 17 kG and a coercivity of about 6 Oe or lower and a high magnetic permeability.

According to the preferred embodiments of the present invention, the magnetostriction is low and can be nearly zero (Table 1). The coercivity is also low and can be (1) 3 Oe or below, or more preferably (2) 2.0 Oe or below, most preferably (3) 1.5 or below, as shown in FIG. 2.

The corresponding preferred compositional range to the coercivity ranges (1) to (3) are as follows:

(1) Hc≦3 Oe
  86.5≦a+b≦92.5
  0.5≦b≦6.6
  0.5≦c≦8.6
  1≦d≦7.7
(2) Hc≦2 Oe
  87.5≦a+b≦91.6
  1.5≦b.≦6.6
  5≦c≦8
  1.5≦d≦6.8
(3) Hc≦1.5 Oe
  89≦a+b≦91.3
  2.5≦b≦6.6
  5.3≦c≦7
  2≦d≦5.4

This range is valid for X being at least Co, and valid for other elements Ni, Cr and V, too.

As shown in FIG. 1, the permeability at the high frequency range of 1 to 10 KHz is as high as at least about 6000 (at 10 KHz) along the easy axis.

Second Aspect

Examples 17–20 and Reference Example 15

Analogous to preceding Examples of the First Aspect, soft magnetic thin films were produced except that alloy targets of respective alloy compositions were used instead of pellets of each elements based on the formula: (91-e)%Fe-e%Ni-6%Zr-3%B in atomic percents varying the "e" value from zero to over 20% as shown in Table 5. The results are shown in Table 5. Exceeding 20 at% Ni (e), the saturation magnetic flux density Bs is lowered. Example 20 showed lowering of Bs only by less than 10% from the case with the lower amount of Ni.

TABLE 5

|  | e [at %] | Hc [Oe] |
| --- | --- | --- |
| Ref. Ex. 15 | 0 | 8.1 |
| Ex. 17 | 4.6 | 1.4 |
| Ex. 18 | 9.1 | 1.4 |
| Ex. 19 | 13.7 | 1.6 |
| Ex. 20 | 18.2 | 1.7 |

It should be noted that obvious modifications may be done in the art without departing from the gist and scope herein disclosed and defined in the appended claims.

What is claimed is:

1. A soft magnetic thin film represented by the formula $Fe_a X_b Zr_c B_d$, wherein a, b, c and d stand for atomic percents of the components Fe, X, Zr and B, respectively, and X indicates at least one member selected from the group consisting of Co, Ni, Cr, and V, wherein $86 \leq a+b \leq 93$, $0 < b \leq 10$, $4 \leq c \leq 9$ and $1 \leq d \leq 8$, wherein said thin film is formed on a substrate by vapor deposition, and said thin film has a coercivity of 2 Oe or less.

2. The soft magnetic thin film as defined in claim 1 wherein b is 0.5 or more.

3. The soft magnetic thin film as defined in claim 1 which has a coercivity of 6 Oe or lower and a saturation magnetic density of at least 17 KG.

4. The soft magnetic thin film as defined in claim 1 which has a coercivity of 1.5 Oe or lower.

5. The soft magnetic thin film as defined in claim 1 which has a permeability of at least about 6000 within the frequency range of 1 to 10 KHz.

6. The soft magnetic thin film as defined in claim 1 in which X is Co.

7. The soft magnetic thin film as defined in claim 1 in which X is Cr.

8. The soft magnetic thin film as defined in claim 1 in which X is Ni.

9. The soft magnetic thin film as defined in claim 1 in which X is V.

10. The soft magnetic thin film as defined in claim 1 in which $86.5 \leq (a+b) \leq 92.5$, $0.5 \leq b \leq 6.6$, $4.5 \leq c \leq 8.6$ and $1 \leq d \leq 7.7$.

11. The soft magnetic thin film as defined in claim 1 in which $87.5 \leq (a+b) \leq 91.6$, $1.5 \leq b \leq 6.6$, $5 \leq c \leq 8$ and $1.5 \leq d \leq 6.8$.

12. The soft magnetic thin film as defined in claim 4 in which $89 \leq (a+b) \leq 91.3$, $2.5 \leq b \leq 6.6$, $5.3 \leq c \leq 7$ and $2 \leq d \leq 5.4$.

13. The soft magnetic thin film as defined in claim 6 which has an oriented axis along the direction of a (110) plane with an interplanar spacing of the (110) planes expanded over an Fe-Zr-B system.

14. A soft magnetic thin film represented by the formula $Fe_a Z_f Ni_e Zr_c B_d$, wherein a, f, e, c and d stand for atomic percents of the components Fe, Z, Ni, Zr and B, respectively, and Z indicates at least one member selected from the group consisting of Co, Ni, Cr, and V, wherein $86 \leq a+e+f \leq 93$, $0 \leq f \leq 10$, $0 < e \leq 20$, $e+f \leq 20$, $4 \leq c \leq 9$ and $1 \leq d \leq 8$, wherein said thin film is formed on a substrate by vapor deposition, and said thin film has a coercivity of 2 Oe or less.

15. The soft magnetic thin film as defined in claim 14 wherein (e+f) is 0.5 or more.

16. The soft magnetic thin film as defined in claim 14 wherein f is 0.5 or more.

17. The soft magnetic thin film as defined in claim 14 which has a coercivity of 2 Oe or lower and saturation magnetic flux density of at least 17 kG.

18. The soft magnetic thin film as defined in claim 14 which has an oriented axis along the direction of a (110) plane with an interplanar spacing of the (110) planes expanded over an Fe-Zr-B system.

19. A soft magnetic thin film represented by the formula $Fe_a X_b Zr_c B_d$, wherein a, b, c and d stand for atomic percents of the components Fe, X, Zr and B, respectively, and X indicates at least one member selected from the group consisting of Co, Ni, Cr, and V, wherein $86 \leq a+b \leq 93$, $0 < b \leq 10$, $4 \leq c \leq 9$ and $1 \leq d \leq 8$, wherein said thin film is formed on a substrate by vapor deposition, and said thin film has a coercivity of 2 Oe or less, even after being heated at a temperature in a range from 500° C. to 600° C.

* * * * *